(12) United States Patent
Vivekananthan et al.

(10) Patent No.: US 12,009,527 B2
(45) Date of Patent: Jun. 11, 2024

(54) CATALYTIC ARRANGEMENT FOR AN ELECTROLYZER SYSTEM OR A FUEL CELL SYSTEM, ELECTROLYZER SYSTEM, FUEL CELL SYSTEM, USE OF A CATALYTIC ARRANGEMENT AND METHOD FOR PRODUCING A CATALYTIC ARRANGEMENT

(71) Applicant: Schaeffler Technologies AG & Co. KG, Herzogenaurach (DE)

(72) Inventors: Jeevanthi Vivekananthan, Herzogenaurach (DE); Yashar Musayev, Nuremberg (DE); Edgar Schulz, Langensendelbach (DE); Moritz Wegener, Erlangen (DE); Ladislaus Dobrenizki, Höchstadt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 427 days.

(21) Appl. No.: 17/257,609

(22) PCT Filed: May 29, 2019

(86) PCT No.: PCT/DE2019/100471
§ 371 (c)(1),
(2) Date: Jan. 4, 2021

(87) PCT Pub. No.: WO2020/007392
PCT Pub. Date: Jan. 9, 2020

(65) Prior Publication Data
US 2021/0273238 A1 Sep. 2, 2021

(30) Foreign Application Priority Data
Jul. 6, 2018 (DE) .................. 10 2018 116 373.8

(51) Int. Cl.
*H01M 4/90* (2006.01)
*H01M 4/88* (2006.01)
(Continued)

(52) U.S. Cl.
CPC ....... *H01M 4/9083* (2013.01); *H01M 4/8867* (2013.01); *H01M 4/926* (2013.01); *H01M 4/96* (2013.01); *H01M 8/0232* (2013.01)

(58) Field of Classification Search
CPC .... H01M 4/96; H01M 4/9083; H01M 4/8867; H01M 4/926; H01M 8/0232
See application file for complete search history.

(56) References Cited

U.S. PATENT DOCUMENTS

| 4,812,352 A | 3/1989 | Debe |
|---|---|---|
| 5,039,561 A | 8/1991 | Debe |

(Continued)

FOREIGN PATENT DOCUMENTS

| CN | 101427404 A | 5/2009 |
|---|---|---|
| CN | 101901913 A | 12/2010 |

(Continued)

OTHER PUBLICATIONS

Marcelo Carmo et al, A Comprehensive Review on PEM Water Electrolysis, International Journal of Hydrogen Energy 38, (2013) pp. 4901-4934, Germany.

(Continued)

*Primary Examiner* — Sarah A. Slifka

(57) ABSTRACT

A catalytic arrangement for an electrolyzer system or a fuel cell system includes a catalyst support unit and a catalyst layer, wherein the catalyst layer has a carbon matrix with a metal, non-metal and/or metalloid doping.

9 Claims, 1 Drawing Sheet

(51) Int. Cl.
*H01M 4/92* (2006.01)
*H01M 4/96* (2006.01)
*H01M 8/0232* (2016.01)

(56) References Cited

U.S. PATENT DOCUMENTS

| | | | |
|---|---|---|---|
| 5,338,430 | A | 8/1994 | Parsonage et al. |
| 6,136,412 | A | 10/2000 | Spiewak et al. |
| 6,306,270 | B1 | 10/2001 | Haenni et al. |
| 2007/0248875 | A1 | 10/2007 | O'Brien et al. |
| 2014/0017594 | A1 | 1/2014 | Takeguchi |
| 2015/0147680 | A1 | 5/2015 | Choi et al. |

FOREIGN PATENT DOCUMENTS

| | | |
|---|---|---|
| CN | 106435518 A | 2/2017 |
| CN | 106463735 A | 2/2017 |
| DE | 60025695 T2 | 9/2006 |
| EP | 3422451 A1 | 1/2019 |
| JP | 2009534175 A | 9/2009 |
| JP | 2011184767 | 9/2011 |
| JP | 2013098091 A | 5/2013 |
| JP | 2015525286 A | 9/2015 |
| JP | 2017152296 A | 8/2017 |
| JP | 2017179408 A | 10/2017 |
| JP | 6306270 B2 | 4/2018 |
| WO | 2014136798 A1 | 9/2014 |
| WO | 2015141595 A1 | 9/2015 |
| WO | 2017070149 A1 | 4/2017 |
| WO | 2017145646 A1 | 8/2017 |
| WO | 2018070149 A1 | 4/2018 |

OTHER PUBLICATIONS

Cecilia Kristin Kjartansdottir et al., Development of Durable and Efficient Electrodes for Large-Scale Alkaline Water Electrolysis, International Journal of Hydrogen Energy 38, (2013) pp. 8221-8231.

Kai Zeng, Recent Progress in Alkaline Water Electrolysis for Hydrogen Production and Applications, Progress in Energy and Combustion Science 36 (2010) pp. 307-326.

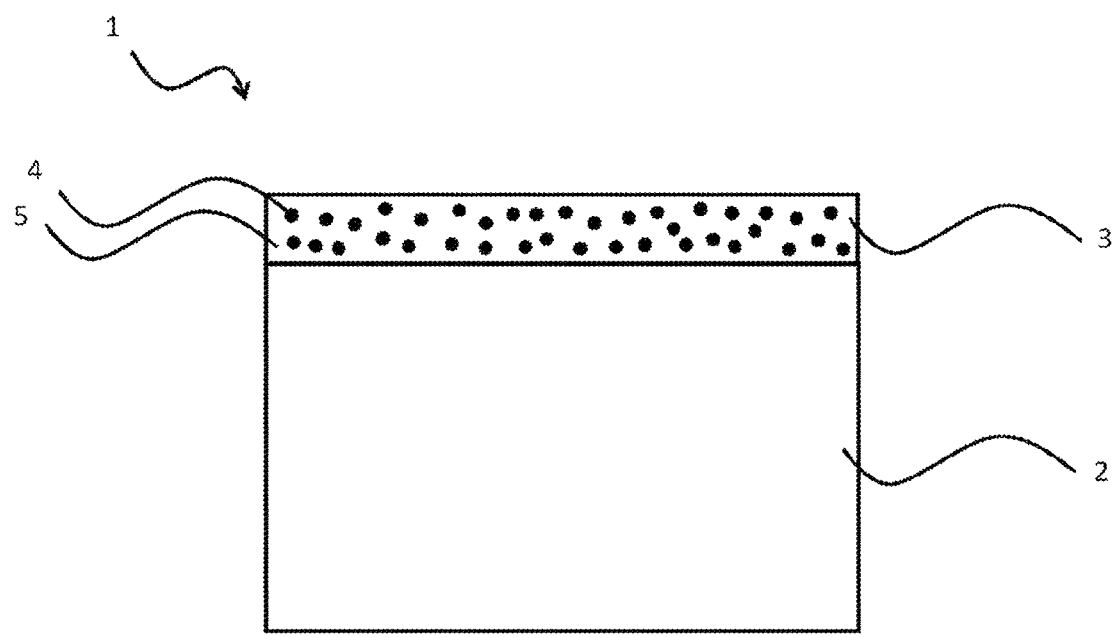

CATALYTIC ARRANGEMENT FOR AN ELECTROLYZER SYSTEM OR A FUEL CELL SYSTEM, ELECTROLYZER SYSTEM, FUEL CELL SYSTEM, USE OF A CATALYTIC ARRANGEMENT AND METHOD FOR PRODUCING A CATALYTIC ARRANGEMENT

CROSS-REFERENCE TO RELATED APPLICATIONS

This application is the U.S. National Phase of PCT Appln. No. PCT/DE2019/100471 filed May 29, 2019, which claims priority to DE 10 2018 116 373.8 filed Jul. 6, 2018, the entire disclosures of which are incorporated by reference herein.

TECHNICAL FIELD

The disclosure relates to a catalytic arrangement for an electrolyzer system or a fuel cell system, comprising a catalyst support unit and a catalyst layer. The disclosure also relates to an electrolyzer system for water splitting and/or hydrogen peroxide development and a fuel cell system for the oxygen reduction reaction. In addition, the present disclosure relates to a use of a catalytic arrangement as part of an electrolyzer system for water splitting and/or hydrogen peroxide development or as part of a fuel cell system for the oxygen reduction reaction. The present disclosure further relates to a method for producing a catalytic arrangement.

BACKGROUND

Such catalytic arrangements are known and are used as electrodes in electrolyzers or in fuel cells.

In electrolyzers, titanium or carbon-supported precious metals, such as Ir, Ru, or Pt, are used, among others. Furthermore, Kjartansdóttir et al., International Journal of Hydrogen Energy, 38 (2013), 9221-8231 discloses the use of nickel, stainless steel, or stainless steel coated with nickel-based alloys as an electrode. Carbon-supported precious metal catalysts are often used in fuel cells.

However, due to the use of expensive materials, in particular precious metals, such catalytic arrangements are often expensive. The long-term stability and efficiency of electrolyzers and fuel cells are also largely determined by the catalytic arrangement used. Further developments in these areas can therefore reduce costs and possibly increase efficiency.

SUMMARY

Against this background, the object arises of providing a corrosion-resistant catalytic arrangement for an electrolyzer system or a fuel cell system which can be produced with reduced material costs and/or has an increased service life.

The object is achieved by a catalytic arrangement for an electrolyzer system or a fuel cell system, comprising a catalyst support unit and a catalyst layer, characterized in that the catalyst layer has a carbon matrix with a metal, non-metal and/or metalloid doping.

It is possible to provide an advantageously corrosion-resistant catalytic converter arrangement which can be manufactured relatively economically, since larger quantities of expensive materials, such as certain precious metals, can be omitted. At the same time, in particular through the use of a catalyst layer, improved long-term stability can be achieved. The catalyst layer in particular has the function of accelerating the reactions and/or reverse reactions (e.g. water oxidation) and increasing the reaction rate (i.e., a change in the kinetics).

In particular, the doping makes up between 0.1 atomic % and 20 atomic % of the catalyst layer or carbon matrix (or has such a proportion in the catalyst layer or carbon matrix).

The catalyst layer may consists of the doped carbon matrix and may not contain any further (larger) amounts of further (expensive) materials.

The carbon matrix can be formed from amorphous carbon, for example. Alternatively, the carbon matrix can be present in the form of a graphite matrix. For example, Triondur® coatings can be considered as the catalyst layer.

According to one embodiment, the catalyst support unit may include an intermediate layer, for example in order to improve the adhesion to the catalyst layer.

The catalyst layer may include several partial layers. For example, several partial layers, each based on a carbon matrix, can be arranged one above the other and have different dopings or doping elements. Alternatively, the partial layers may have the same doping properties.

The catalyst layer may be a cover layer, i.e., an outer layer, of the catalytic arrangement. It is thus possible for the catalytic properties and the corrosion resistance of the catalyst layer to have a particularly advantageous effect.

According to an advantageous embodiment, it is provided that the catalyst support unit has stainless steel. In particular, the catalyst support unit may consists at least essentially of a steel, in particular stainless steel.

One embodiment provides that the catalyst support unit has a foam or a mesh comprising one or more transition metals of the fourth to sixth periods. It is particularly conceivable that the catalyst support unit consists of a foam or mesh composed of one or more transition metals of the fourth to sixth period.

According to one embodiment it is provided that the doping has one or more precious metals, in particular ruthenium, Ru, iridium, Ir, and/or platinum, Pt. In particular, it is conceivable that the precious metal or metals make up between 0.1% by weight and 2% by weight of the catalyst layer or carbon matrix (or have such a proportion in the catalyst layer or carbon matrix). It is particularly preferred that the doping has ruthenium and/or iridium.

According to one embodiment, the doping may have one or more transition metals of the fourth to sixth period, in particular nickel, Ni, manganese, Mn, cobalt, Co, iron, Fe, and/or molybdenum, Mo. It is preferably possible that the transition metal(s) of the fourth to sixth period make up between 0.1 atomic % and 5 atomic % of the catalyst layer or carbon matrix (or have such a proportion in the catalyst layer or carbon matrix). It is particularly preferred that the doping has nickel and/or manganese.

One embodiment provides that the doping has one or more further metals, in particular aluminum, Al, and/or tin, Sn. In particular, it is conceivable that the further metal(s) make up between 0.1 atomic % and 3 atomic % of the catalyst layer or carbon matrix (or have such a proportion in the catalyst layer or carbon matrix).

According to one embodiment, it is provided that the doping has one or more non-metals and/or one or more metalloids, in particular sulfur, S, phosphorus, P, nitrogen, N, oxygen, O, and/or boron, B. In particular, it is conceivable that the metalloid(s) and/or the non-metal(s) make up between 0.1 atomic % and 8 atomic % of the catalyst layer or carbon matrix (or have such a proportion in the catalyst layer or carbon matrix). It is particularly preferred that the doping has nitrogen and/or oxygen.

In an electrolyzer system for water splitting and/or hydrogen peroxide development, the electrolyzer system may include a catalytic arrangement according to any one embodiment as previously described.

It is thereby advantageously possible to provide an electrolyzer system with increased long-term stability and at the same time to reduce the use of expensive material components, such as precious metals. Thus, oxygen development reactions and hydrogen development reactions (ODR and HDR) as well as hydrogen peroxide development reactions can be carried out particularly efficiently.

A fuel cell system for the oxygen reduction reaction may include a catalytic arrangement according to any one embodiment as previously described.

It is thereby advantageously possible to provide a fuel cell system with increased long-term stability and at the same time to reduce the use of expensive material components such as precious metals, which enables oxygen reduction reactions (ORR) to be carried out efficiently.

To achieve the above-mentioned object, a use of a catalytic arrangement according to any one embodiment as previously described is proposed as part of an electrolyzer system for water splitting and/or hydrogen peroxide development or as part of a fuel cell system for the oxygen reduction reaction.

In addition, to achieve the above-mentioned object, a method for producing a catalytic arrangement according to any one embodiment as previously described is proposed, wherein the catalyst layer is deposited on the catalyst support unit with the aid of a physical vapor deposition or a chemical coating method.

Furthermore, the advantageous configurations, embodiments and features explained in connection with the catalytic arrangement can also be used alone or in combination in the electrolyzer system, the fuel cell system, the use of a catalytic arrangement, and in the method for producing a catalytic arrangement.

BRIEF DESCRIPTION OF THE DRAWINGS

Further details and advantages will be explained below with reference to the exemplary embodiment shown in the drawings. In the figures:

FIG. 1 shows an exemplary embodiment of a catalytic arrangement for an electrolyzer system or a fuel cell system in a schematic representation.

DETAILED DESCRIPTION

FIG. 1 shows an embodiment of a catalytic arrangement 1, which can be used as an electrode in a electrolyzer system or as part of a fuel cell system. The catalytic arrangement 1 comprises a catalyst support unit 2 and a catalyst layer 3. The catalyst support unit 2 can consist, for example, of a stainless steel or of a foam or mesh comprising one or more transition metals of the fourth to sixth period. The catalyst layer 3 is arranged above the catalyst support unit 2. This typically represents the outer part of the catalytic arrangement 1, i.e., it is free-standing on its side facing away from the catalyst support unit 2, and can thus be brought into contact with fluids. The represented catalyst layer 3 consists essentially of a carbon matrix 5 with a doping 4. It is conceivable that the catalyst layer 3 comprises several partial layers, i.e., is designed as a layer system. The doping 4 can comprise metals, metalloids, and/or non-metals. For example, the doping 4 can have one or more precious metals, such as ruthenium, iridium, and/or platinum. Alternatively or additionally, the doping can have one or more transition metals of the fourth to sixth period, such as nickel, manganese, cobalt, iron, and/or molybdenum. Alternatively or additionally, the doping can have one or more non-metals and/or one or more metalloids, such as sulfur, phosphorus, nitrogen, oxygen, and/or boron. Again, alternatively or additionally, it is possible that the doping comprises one or more further metals, such as aluminum and/or tin.

It is conceivable that the catalyst support unit 2 comprises one or more intermediate layers (not shown) adjoining the catalyst layer 3.

An exemplary embodiment of a catalytic arrangement 1 for an electrolyzer system or a fuel cell system, comprising a catalyst support unit 2 and a catalyst layer 3, is described above, wherein the catalyst layer 3 has a carbon matrix 5 with a metal, non-metal and/or metalloid doping 4.

LIST OF REFERENCE SYMBOLS

1 Catalytic arrangement
2 Catalyst support unit
3 Catalyst layer
4 Doping
5 Carbon matrix

The invention claimed is:

1. A catalytic arrangement for an electrolyzer system or a fuel cell system, comprising a catalyst support unit and a catalyst layer, wherein the catalyst layer has a carbon matrix with a metal, non-metal and/or metalloid doping, wherein the doping includes aluminum (Al) or tin (Sn).

2. The catalytic arrangement according to claim 1, wherein the catalyst support unit has stainless steel.

3. The catalytic arrangement according to claim 1, wherein the catalyst support unit has a foam or a mesh comprising one or more transition metals of the fourth to sixth period.

4. The catalytic arrangement according to claim 1, wherein the doping includes one or more precious metals.

5. The catalytic arrangement according to claim 1, wherein the doping includes one or more transition metals of the fourth to sixth period.

6. The catalytic arrangement according to claim 1, wherein the doping includes sulfur (S), phosphorus (P), nitrogen (N), oxygen (0), or boron (B).

7. An electrolyzer system for water splitting and/or hydrogen peroxide development, wherein the electrolyzer system comprises a catalytic arrangement according to claim 1.

8. A fuel cell system for an oxygen reduction reaction, wherein the fuel cell system comprises a catalytic arrangement according to claim 1.

9. A method for producing a catalytic arrangement according to claim 1, wherein the catalyst layer is deposited on the catalyst support unit with the aid of a physical vapor deposition or a chemical coating method.

* * * * *